March 20, 1962 J. F. COULEUR 3,026,035

DECIMAL TO BINARY CONVERSION

Filed Oct. 7, 1957

| BINARY CODED DECIMAL HUNDRED 8 4 2 1 (4) | TEN 8 4 2 1 (5) | UNIT 8 4 2 1 (9) | BINARY | |
|---|---|---|---|---|
| 0 1 0 0 | 0 1 0 1 | 1 0 0 1 | | |
| 0 1 0 | 0 0 1 0 | 1 1 0 0 | 1 | SHIFT |
| 0 1 0 | 0 0 1 0 | 1 0 0 1 | | SUBTRACT 3 FROM UNITS |
| 0 1 | 0 0 0 1 | 0 1 0 0 | 1 1 | SHIFT |
| 0 | 1 0 0 0 | 1 0 1 0 | 0 1 1 | SHIFT |
| 0 | 0 1 0 1 | 0 1 1 1 | | SUBT. 3 FROM 10 & UNIT |
| | 0 0 1 0 | 1 0 1 1 | 1 0 1 1 | SHIFT |
| | 0 0 1 0 | 1 0 0 0 | | SUBTRACT 3 FROM UNIT |
| | 0 0 1 | 0 1 0 0 | 0 1 0 1 1 | SHIFT |
| | 0 0 | 1 0 1 0 | 0 0 1 0 1 1 | SHIFT |
| | 0 0 | 0 1 1 1 | | SUBTRACT 3 FROM UNIT |
| | 0 | 0 0 1 1 | 1 0 0 1 0 1 1 | SHIFT |
| | | 0 0 0 1 | 1 1 0 0 1 0 1 1 | SHIFT |
| | | 0 0 0 | 1 1 1 0 0 1 0 1 1 | SHIFT |
| | | 0 0 | 0 1 1 1 0 0 1 0 1 1 | SHIFT |
| | | | =459 | |

INVENTOR:
JOHN F. COULEUR,

BY Donald C Kenney
HIS ATTORNEY.

United States Patent Office
3,026,035
Patented Mar. 20, 1962

3,026,035

DECIMAL TO BINARY CONVERSION

John F. Couleur, Fayetteville, N.Y., assignor to General Electric Company, a corporation of New York Filed Oct. 7, 1957, Ser. No. 688,589
8 Claims. (Cl. 235—155)

This invention relates to a method and apparatus for converting a representation of data in a first number system to an equivalent representation in a second number system. More particularly, this invention relates to a method and apparatus for converting a binary coded decimal number to a pure binary number. The converse problem of converting a pure binary number to a binary coded decimal number forms the subject matter of an application Serial No. 688,509 entitled "Binary to Decimal Conversion" filed by John F. Couleur concurrently herewith and assigned to the same assignee as the present application.

It is well known in the digital computing arts that any given number can be expressed in many different number systems each using a different number base or radix. The number system in common everyday use is, of course, the decimal system in which a base or radix of ten is used. Each digit of a number is then understood to be a multiplier or coefficient of a power of ten, the power implied increasing from right to left in accordance with the positional significance of the digit. Thus, the decimal number 459 may be explicitly written as $$4\times10^2+5\times10^1+9\times10^0$$

Although many digital computers have been built which are designed to operate on an essentially decimal basis, many of the more modern digital computers are designed to operate on data expressed in pure binary notation rather than in decimal notation. In the binary system, of course, a number base of two is used in place of the number base or radix ten used in the decimal system. Thus, the decimal number nine may be explicitly written in pure binary form as $1\times2^3+0\times2^2+0\times2^1+1\times2^0$. More briefly, this binary nine is commonly written as 1001 wherein the number base two is implied and only the coefficients are expressed. Furthermore, those computers which do operate on decimal data frequently use a number system known as binary coded decimal rather than pure decimal. Thus, the decimal number 459 in binary coded decimal form can be explicitly expressed as $$(0\times2^3+1\times2^2+0\times2^1+0\times2^0)10^2 +(0\times2^3+1\times2^2+0\times2^1+1\times2^0)10^1 +(1\times2^3+0\times2^2+0\times2^1+1\times2^0)\times10^0$$

More briefly, this number is commonly written as 0100 0101 1001. It will be noted that the implied radix for each group of four binary digits is still ten, but that each decimal digit is individually expressed in binary notation in order to render the data more tractable to machine techniques. For a more complete discussion of arithmetic or number system reference is made to a book entitled "High Speed Computing Devices" written by the staff of Engineering Research Associates Incorporated and published by McGraw Hill, New York, 1950, or to a book entitled "Arithmetic Operations in Digital Computers" written by R. K. Richards and published by D. Van Nostrand Company, New York, 1955.

It has long been known that the arithmetic process of converting a pure decimal number to a pure binary number consists of repeated division of the decimal number by 2, the binary number base, and noting the remainder after each division. See, for example, pp. 78 and 79 of the first above noted book. A similar arithmetic process is applicable to the conversion of binary coded decimal numbers to pure binary numbers. The instrumentation of this process, however, using standard division techniques has in the past required cumbersome and expensive equipment and has been excessively time consuming. The problems of entering binary coded decimal keyboard data to a pure binary computer system or of utilizing binary coded decimal output data from a decimal computer system in a pure binary computer system, for example, have in the past been solved by using either a miniature computer or a time consuming counting process in order to perform the necessary conversion from one number system to the other.

It is therefore an object of this invention to provide a method and apparatus for rapidly and economically converting a representation of data in a first number system to an equivalent representation of data in a second number system.

It is a more specific object of this invention to provide a method and apparatus for converting a binary coded decimal number to a pure binary number.

It is a still further object of this invention to provide a new and improved method and apparatus for processing data.

Briefly, in accordance with one aspect of this invention, a decimal number of N digits is represented in binary coded decimal form and read into a shift register, for example, of the general type shown in pages 144–148 of the reference "Arithmetic Operations in Digital Computers," R. K. Richards, published by D. Van Nostrand Co., Inc. in 1955, having 4N stages grouped to form N decades, the content of each decade representing one digit of said decimal number. The conversion process consists of shifting this binary coded decimal number out of the register one digit at a time, least significant digit first, testing the magnitude of the content of each decade after each shift, and subtracting binary three from any decade the binary content of which is equal to or greater than eight after any shifting step. The output of the register can then be shown to be a pure binary representation of the binary coded decimal number originally read into the register.

While the novel and distinctive features of the invention are particularly pointed out in the appended claims, a more expository treatment of the invention, in principle and in detail, together with additional objects and advantages thereof, is afforded by the following description and accompanying drawings in which;

Figures 1, 2, 3:
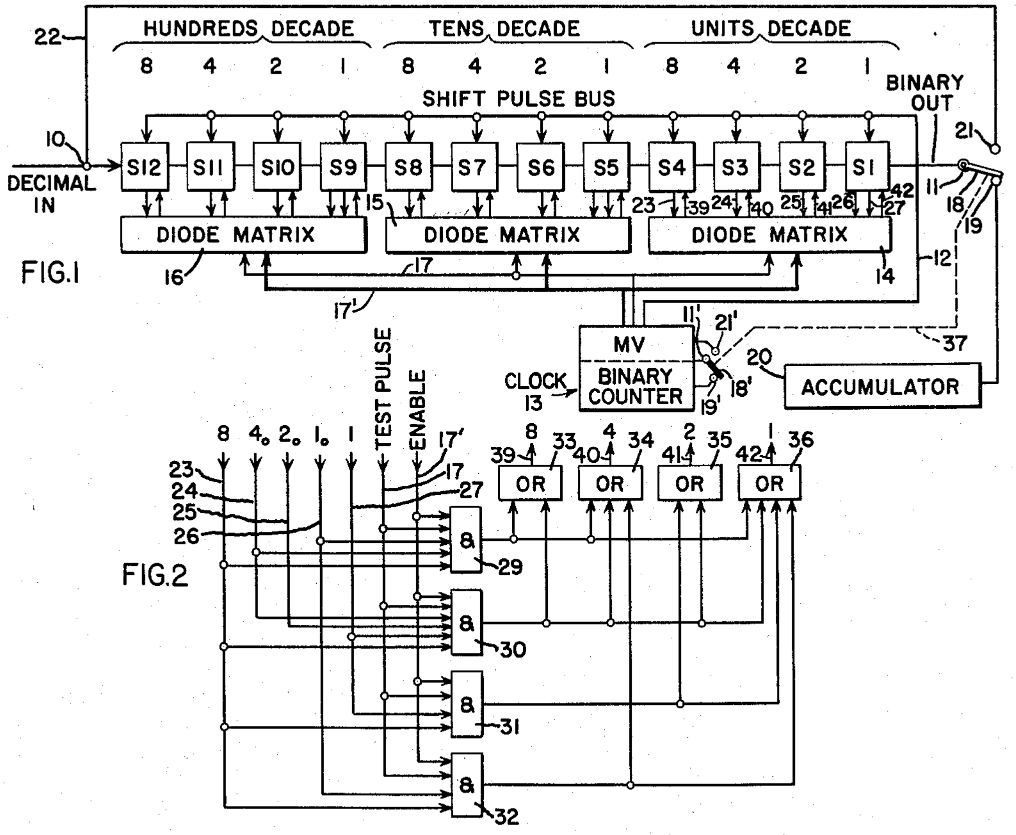
FIG. 1 is a block diagram of the conversion apparatus.
FIG. 2 is a block diagram of the logic circuitry embodied in each of the diode matrices shown in FIG. 1.
FIG. 3 is a chart illustrating the operation of the apparatus of FIGS. 1 and 2.

Turning now to the drawing and in particular to FIG. 1 thereof, there is shown a shift register which, by way of example only, is illustrated as consisting of the twelve stages, S1 through S12. Of course, it will be understood that a shift register of any desired number of stages could be used, there being in general 4N stages for an N digit decimal number. Thus the four stages, S1, S2, S3, and S4, which are associated with the diode matrix 14 are indicated in FIG. 1 as comprising the units decade of the shift register; the four stages, S5, S6, S7, and S8, which are associated with diode matrix 15 are indicated as comprising the tens decade of the shift register; and the four stages, S9, S10, S11, and S12, which are associated with diode matrix 16 are indicated as comprising the hundreds decade of the shift register. There are thus N decades and 4N stages for an N digit decimal number.

Each stage of a decade may contain or represent either a binary one or a binary zero by being in one of two stable states (see page 47 of the aforementioned Richards publication). However, when the number is in binary coded decimal form the stages of each decade are assigned respective weights of 8, 4, 2, and 1 decreasing in significance in the same direction as do the decades throughout the register as shown in FIG. 1. These weights, of course, are simply the implied powers of the number base two which, as explained above, are implicit in the binary coded decimal form. That is, $1=2^0$, $2=2^1$, $4=2^2$, and $8=2^3$. Similarly, each decade has impliedly associated therewith a power of 10 which increases from right to left. The weights 8, 4, 2, and 1 will hereinafter be used generically to refer to the corresponding stage of any one of the decades. Thus a "4" stage will be used to mean any or all of the stages S3, S7, and S11.

Any conventional type of shift register (see pages 144–148 of the aforementioned Richards publication) may be used. As is well known in the art, each stage of such a register consists of a bistable device which may, for example, comprise a vacuum tube "flip-flop," a similar transistor circuit, or a bistable magnetic circuit. As is common practice, one of the two states of each bistable device is taken to represent a binary zero, whereas the other state of the device is taken to represent a binary one. The stages of the register are connected in cascade or serial relation between an input terminal 10 and an output terminal 11. Each of the stages of the register is connected by a shift pulse bus 12 to a source 13 of clock pulses (see pages 49, 322, 337 of the Richards publication). As is also well known in the art, the circuitry of each stage is such that upon application of a shift pulse to the bus 12, each of the stages assumes the state of the preceding stage. That is to say, S1 assumes the state which S2 had, S2 assumes the state which S3 had, etc. Of course, the prior state of stage S1 is indicated in response to a shift pulse at terminal 11. That is to say, in accordance with the usual convention, if stage S1 contained a binary one a pulse will appear at terminal 11, whereas if stage S1 contained a binary zero no pulse will appear at terminal 11 in response to the application of a shift pulse. It will thus be noted that the register is connected to shift its content from left to right as shown in FIG. 1.

Each decade of the register has associated therewith a logic circuit such as one of the diode matrices 14, 15, and 16 shown connected respectively to the units decade, the tens decade, and the hundreds decade. Each of the diode matrices 14, 15, and 16 may, for example, consist of a logic circuit of the type shown by way of example in the block diagram of FIG. 2. For further details, reference can be made to chapters 2, 3 and 4 of the aforementioned Richards publication. A test pulse bus 17 connects each of the diode matrices to the clock 13. The clock 13 may, for example, consist of a free-running multivibrator which puts out pulses alternately first on the line 12 and then on the test pulse bus 17. For any given number of stages there will be a corresponding known number of required shifts of the shift register comprising S1–S12 under control of the pulses on lead 12 from clock 13 to accomplish conversion between two selected number systems fewer in number than the stages due to the subtraction process employed. It is illustrated in FIG. 3 that there will be 10 shifts employed in the 12-stage embodiment for the conversion described and illustrated in FIG. 1. Thus, for a complete conversion 10 shift pulses would be required. When the conversion commences, the free running multivibrator of the clock is actuated. A counter chain or circuit, also a part of the clock, counts the output pulses of the multivibrator. The clock also includes a counter circuit which is connected to shut off the multivibrator after the desired number of pulses has been emitted as will be explained in greater detail below. Such a combination of a counter chain and multivibrator is mentioned on pages 337–341 and 322 of the Richards publication cited heretofore.

Output terminal 11 is shown connected by a switch arm 18 via a terminal 19 to an accumulator 20. In this manner of connection a binary coded decimal number which has been read into the shift register via input terminal 10 is read out of the shift register in pure binary form and stored in accumulator 20, or applied to any desired circuitry. The accumulator 20 may be another shift register as previously mentioned. The means for reading in the binary coded number may include a shift register, or each stage S1–S12 may be individually set to represent the proper number. Suffice it to say that the number is stored in the register prior to starting the conversion. If the switch arm 18 is positioned on contact 21, a binary coded decimal number which has been read into the register may be shifted out at terminal 11 and read back into the same register via line 22 and input terminal 10 in pure binary form. The number may then, if desired, be read out by the usual techniques in either serial or parallel form. When switch arm 18 is on contact 19, switch arm 18' is made to contact 19' by means of mechanical linkage 37 such that the clock 13 emits an "enable" pulse coincident with each test pulse which is applied along a separate channel of line 17' to each of the diodes. When switch arm 18 is on contact 21, however, 18' contacts terminal 21' permitting these "enable" pulses (by any conventional circuitry not shown) to be emitted under control of the clock's counter for only certain ones of the test pulses in a manner which will be described in detail below.

In operation, the conversion process is accomplished in the diode matrices associated with the register which determines if a one has been shifted down from a higher decade of the register to a lower decade of the register. If it has, binary three is subtracted from the resulting number in the lower decade to compensate for the gain of three picked up in shifting a one from the units position of the higher decade to the 8 position of the lower decade. The gain of three comes from the fact that the one in the unit place of the higher decade has a value of ten with respect to the next lower decade, whereas in the 8 place of the lower decade this one has a value of 8. Since shifting toward a lower digit should in pure binary notation accomplish a division by 2, that is, by the binary number base, obviously three units (8−5) have been gained in shifting across the dividing line between the decades as used in the binary coded decimal representation. Therefore, three is subtracted from the number in the lower decade to compensate for this gain.

The diode matrix shown in FIG. 2 is based on the following logic. If, after the first shift, a one appears in the 8 place associated with this particular matrix, it can only have come from a higher decade and three must be subtracted from the number resulting in the lower decade. The five possible numbers and the difference after subtracting three are:

| Number | | | | Difference | | | |
|---|---|---|---|---|---|---|---|
| 8 | 4 | 2 | 1 | 8 | 4 | 2 | 1 |
| 1 | 0 | 0 | 0=8 | 0 | 1 | 0 | 1=5 |
| 1 | 0 | 0 | 1=9 | 0 | 1 | 1 | 0=6 |
| 1 | 0 | 1 | 0=10 | 0 | 1 | 1 | 1=7 |
| 1 | 0 | 1 | 1=11 | 1 | 0 | 0 | 0=8 |
| 1 | 1 | 0 | 0=12 | 1 | 0 | 0 | 1=9 |

It is convenient in a shift register to accomplish this subtraction by flipping, or complementing, digits, that is to say, by changing a zero to a one, or a one to zero by changing the electrical state of the bistable device in the affected stage. From the above chart it will be seen that the requirements for subtracting three when the number in a decade is equal to or greater than 8 may be expressed in the statements of fact below wherein numerals are used to designate the stages of a decade and the binary content of the stage is written out as "one" or "zero."

If 8 is one and 1 is zero, then 4 and 1 must flip;

If 8 is one and 4 and 1 are zero, then 8, 4, and 1 must flip;

If 8 and 1 are one and 4 and 2 are zero, then 8, 4, 2, and 1 must flip;

If 8 and 1 are one, then 2 and 1 must flip.

The matrix of FIG. 2 is designed to sense which, if any, of these requirements are met and to put out the pulses to flip the required stages, in accordance with the above statements of fact. In FIG. 2 the lines 23, 24, and 25 are connected as inputs from the stages having weights of 8, 4, and 2 respectively, whereas the lines 26 and 27 are connected to the stage having unit weight. The lines 23 and 27 will be activated if their respective stages contain a binary one, whereas the lines 24, 25, and 26 will be activated if their respective stages contain a binary zero. This is indicated in FIG. 2 by the zero subscripts on the designations of 4, 2, and 1 associated with lines 24, 25, and 26. Line 23 is connected to each one of a group of logical "and" circuits 29, 30, 31, and 32. Each of these "and" circuits is such that it will emit or transmit a pulse only in response to the simultaneous application of a pulse or signal to all of its input terminals. Many such circuits are known in the art and each of the circuits 29 through 32 may be of any conventional type such as, for example, an appropriately connected diode stage. Line 24 is connected to the "and" circuits 29 and 30, line 25 connects only to the circuit 30, line 26 connects to the circuits 29 and 32, line 27 connects to circuits 30 and 31, whereas the test pulse line 17 and the "enable" pulse line 17' are connected to each of the "and" circuits 29 through 32. Lines 39–42 couple the outputs of respective "or" circuits 33–36 to respective ones of the 8-4-2-1 stages of the decades as shown in FIG. 1.

The output from "and" circuit 30 is connected to each of a group of "or" circuits 33, 34, 35, and 36. The output from "and" circuit 29 is connected to "or" circuits 33, 34, and 36, the output from "and" circuit 31 is connected to "or" circuits 35 and 36, while the output from "and" circuit 32 is connected to "or" circuits 34 and 36. Each of the "or" circuits 33 through 36 may be of any conventional type and has the property that it will provide an output pulse in response to a signal or pulse applied at any one of its input terminals. The output from these "or" circuits is connected back to the respective stages of the associated decade as indicated by the arrow designations in FIG. 1 and is used as the flipping pulse which performs the subtraction in accordance with the chart and logical equations given above.

Turning to FIG. 3 there is shown a chart illustrating the operation of the system of FIGS. 1 and 2 in converting the decimal number 459 to binary form. It will be noted that the 12 columns of the chart under the bracket labeled "Binary Coded Decimal" represent the 12 stages of the shift register, the entry in each position being the content of the particular stage at a given time. The 15 rows of the chart represent the 15 different steps involved in the conversion process for this number. Thus, it will be noted that in the first step the number 459 is read into the register in binary coded decimal form. The clock 13 then puts out a shift pulse over line 12 which moves the entire content of the register one stage to the right. The binary one which had been in stage S1 is shown in the chart under the heading "Binary" and in practice would be entered in accumulator 20 or applied in any desired manner. This binary one is the least significant digit of the binary representation of the number 459. Next the clock 13 puts out a test pulse over the line 17. This pulse is applied to each of the diode matrices as the actuating input to their "and" circuits to determine if any of the decades now contain a number equal to or greater than 8. It will be noted that in the second row of the chart, the unit decade contains a binary representation of 12. As explained above, diode matrix 14 is such that it puts out the necessary pulses to subtract three from this number and produce the representation shown in the third row of the chart.

Next, the clock 13 again puts out a shift pulse along line 12 and the entire content of the register is again shifted one place to the right to produce the configuration shown in the fourth row of the chart. It will be noted that the one from the stage S1 has again been shifted out and becomes the second least significant digit of the binary number. Next, a test pulse from clock 13 is applied to line 17. In the configuration shown in the fourth row of the chart none of the decades contain a number equal to or greater than 8. Hence, the next indicated step is another shift of the content of the register produced by the next pulse applied by the clock to the shift pulse bus 12. That is to say, the chart indicates the test steps only for those instances where an actual subtraction is performed by pulses emitted from the "or" circuits 33, 34, 35, and 36 to the stages of one of the decades. It will, of course, be understood, however, that the actual sequence of steps is shift, test, shift, test, etc. Each of the shift and test pulses may, for example, consist of uniformly spaced half microsecond pulses. The complementing or flipping, of course, occurs during the test pulse when the conditions of any one of the above logic equations are satisfied.

The sequence described above is repeated as indicated by the chart of FIG. 3 until the entire number has been shifted out of the register. Since the remaining steps are repetitive, it is not deemed necessary to describe them in detail. It is believed that the chart of FIG. 3 is self-explanatory in view of the above discussion. It should, however, be noted that in general the apparatus of the present invention requires at most 8N steps to convert an N digit decimal number to a pure binary number. This will be seen from noting that the binary coded decimal representation of an N digit number employs 4N binary bits and that one shift step and one test step per bit are necessary to shift out and convert the binary coded decimal number to a pure binary number. It follows that the conversion time required by the present apparatus is equal to 8N times the transfer time of the shift register for an N digit decimal number.

If the switch arm 18 in FIG. 1 is positioned on contact 21, the binary output from the register is applied along line 22 to the input terminal 10 of the register. In this position it is necessary to prevent the high order diode matrices from operating on the incoming binary number as though it were a binary coded decimal number. This can be readily accomplished by applying an "enable" pulse generated by clock 13 under the control of its counter along lines of cable 17' to each of the diode matrices. The lines of cable 17' are connected to each of the "and" circuits 29, 30, 31, and 32 with the result that none of these circuits can have an output in the absence of a pulse on line 17'. When this double use of the register is desired, as selected by connecting contacts 11' and 21' by 18', an "enable" pulse is applied to diode matrices 15 and 14 during the first four test steps and to diode matrix 14 during the next four test steps, and to none of the matrices during the last four test steps. With this mode of operation a binary coded decimal number which has originally been read into the 12 stage register at input terminal 10 may be operated on and in a sequence of 24 steps transferred out of the register at terminal 11 and back into the other end of the register as a pure binary representation of the original number.

It should be noted that this conversion operation could be performed faster by the use of a more complex matrix which would permit the test and shift steps to be conducted simultaneously. It will also be apparent to those skilled in the art that other logic equations could be used to satisfy the conditions listed in the chart above and would result in specifically different matrix circuits which would, nonetheless, give the same result. It should further be noted that a similar type of conversion process is applicable as between number system other than the binary coded decimal and pure binary forms. For example, a tertiary coded duodecimal number could be similar techniques be converted to a pure tertiary number.

It is believed that these alternatives will be more readily apparent by considering the foregoing specific exemplary embodiment of the invention from the following point of view. In the classical process of dividing a decimal number of several digits by 2, each of the digits is divided by 2 and any remainder occasioned by one of the digits being odd is accommodated by adding 10 to the next lower digit. In the present method and apparatus for conversion of binary coded decimal to binary numbers, each shift performs a binary division by 2. Accommodation of the remainder is accomplished after the shift by testing the 8 stage of each decade for presence of a binary one since this is an indication of the next higher decade having been odd. The one should, therefore, be removed from the 8 stage and, a division by 2 having taken place with the shift, five rather than ten should be added to the number in the decade. Since subtraction of eight and addition of five is identical to subtraction of three, it will be seen that the matrices accomplish a true division by two. It will be obvious that apparatus other than the matrices could be used to perform the necessary arithmetic to accommodate remainder in accordance with the present invention. The matrices illustrated are, however, a preferred embodiment of the invention since shift register stages lend themselves well to the complementing process.

It should further be noted that, as pointed out above, the word "shift register" has been used to mean any apparatus for storing and progressively transferring data in order to facilitate its sequential examination. The logic circuits are illustrated as having an operating position which is fixed relative to the moving data. It will be apparent, however, that the same relationship could be achieved and the same process carried out by considering the data to be held in a fixed position and sequentially transferring the logical operations performed upon the data. Such a transfer of logic operations could be carried out, for example, by means of stepping switches scanning information stored in relays or any other bistable device. A stepping switch can scan. One wiper, per bit, each traveling one bit behind the other would successfully move the logic past the statically stored information. The conversion would be directed by a second set of stepping wipers moving with the first set. Of course, any such apparatus is essentially nothing more than an equivalent of the shift register and matrices described above.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles.

What I claim and desire to secure by Letters Patent of the United States is:

1. Apparatus for converting a binary coded decimal number of N decimal digits to an equivalent binary number which comprises, a shift register having 4N cascaded stages grouped to form N decades of consecutively decreasing decimal significance, each of said decades consisting of four consecutively adjacent stages of said register, the four binary stages of each of said decades having decimal weights of 8, 4, 2, and 1 respectively and arranged in decreasing order of weight in the same direction as said decades decrease in significance throughout said register, the sum of the weighted binary content of the four stages of each decade representing one digit of said N digit decimal number; a source of clock pulses connected to shift the entire binary content of said register one stage at a time in said direction of decreasing significance; circuit means associated with each of said decades and connected to subtract binary three from the content of any decade the binary content of which is equal to or greater than eight after any shift; the operation of said circuit means being synchronized with that of said shift register by pulses from said source of clock pulses; said source of clock pulses being controlled by a counter to cause said shift register to perform a predetermined number of shifting operations.

2. Apparatus for converting a binary coded decimal representation of an N decimal digit number to an equivalent binary representation thereof comprising, a shift register having 4N cascaded stages grouped to form N decades of consecutively decreasing decimal significance, the four binary stages of each of said decades having decimal weights of 8, 4, 2, and 1 respectively and arranged in decreasing order of weight in the same direction as said decade decrease in significance throughout said register, the sum of the weighted binary content of the four stages of each decade representing one digit of said N digit decimal number; first means to shift the entire content of said register one stage at a time in said direction of increasing significance, second means to subtract binary three from the content of any decade containing a number equal to or greater than eight, and third means connected to control the operation of said first and second means.

3. Apparatus as in claim 2 wherein the output from the least significant stage of said shift register is applied as an input to the most significant stage of said shift register and wherein said third means include means to selectively render said second means operative or inoperative during different time intervals.

4. Apparatus as in claim 2 wherein said second means comprises a plurality of diode matrices, one of said matrices being connected to each of said decades.

5. Apparatus for converting a binary coded decimal representation of an N decimal digit number to an equivalent binary representation thereof comprising, a shift register, the respective binary states of the individual stages of said shift register affording a representation of said binary coded decimal number, said shift register having 4N cascaded stages grouped to form N decades of consecutively decreasing decimal significance, the four binary stages of each of said decades having decimal weights of 8, 4, 2, and 1 respectively and arranged in decreasing order of weight in the same direction as said decade decrease in significance throughout said register, the sum of the weighted binary content of the four stages of each decade representing one digit of said N digit decimal number; individual logic circuit means associated with each of said decades, each of said logic circuit means being connected to subtract binary three from the content of any decade containing a number equal to or greater than eight in response to the application of a test pulse to said logic circuit; clock means connected to apply pulses in a recurring sequence in which every other one of said pulses is applied as a shift pulse to shift the entire content of said register by one stage in said direction of decreasing significance and the remaining alternate ones of said pulses are applied as test pulses to all of said logic circuits; said clock means including a counter connected to control the total number of pulses emitted by said clock means.

6. Apparatus as in claim 5 in which said total number of pulses is equal to 8N, said apparatus further including accumulator means to store the output from the least significant stage of said shift register.

7. Apparatus as in claim 5 and further including means to connect the output from the least significant stage to the input to the most significant stage of said register and means to selectively render said logic circuits operative or inoperative at predetermined times.

8. An arrangement for converting a binary coded decimal number of N decimal digits to an equivalent binary number which comprises a shift register having 4N cascaded stages grouped to form N decades of consecutively decreasing decimal significance, said decades each comprising a set of four binary stages having decimal weights of 8, 4, 2 and 1 respectively and arranged in decreasing order of weight in same direction as said decades decrease in significance throughout said receiver, the sum of the weighted binary content of the four stages of each decade representing one digit of said N digit decimal number, means for representing said first named decimal number by the respective binary states of the individual stages of said shift register, means for shifting the entire binary content of said register one stage in said direction of decreasing significance, means for subtracting binary three from the content of any decade, the binary content of which is equal to or greater than eight after said shifting step, means for repeating said second and third steps in alternate sequence until the entire content of said register has been shifted out, the first binary digit so shifted out being the least significant digit of said binary number and each succeeding binary digit so shifted out being the next most significant digit of said binary number.

References Cited in the file of this patent

UNITED STATES PATENTS 2,860,327 Campbell ---------------- Nov. 11, 1958
2,894,686 Holmes ------------------ July 14, 1959